United States Patent
Miyata

(10) Patent No.: US 7,404,570 B2
(45) Date of Patent: Jul. 29, 2008

(54) AIR BAG APPARATUS FOR MOTORCYCLE, METHOD OF MANUFACTURING AIR BAG APPARATUS FOR MOTORCYCLE, AND MOTORCYCLE WITH AIR BAG APPARATUS

(75) Inventor: Yasuhito Miyata, Shiga (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 10/439,135

(22) Filed: May 15, 2003

(65) Prior Publication Data

US 2003/0214122 A1 Nov. 20, 2003

(30) Foreign Application Priority Data

May 15, 2002 (JP) ............... 2002-140428

(51) Int. Cl.
*B60R 21/16* (2006.01)

(52) U.S. Cl. .............. 280/728.2; 280/728.3; 280/730.1; 280/743.1

(58) Field of Classification Search .............. 280/728.2, 280/739, 743.1, 728.3, 736
See application file for complete search history.

(56) References Cited

U.S. PATENT DOCUMENTS

| | | | | |
|---|---|---|---|---|
| 3,930,667 | A | * | 1/1976 | Osuchowski et al. ...... 280/730.1 |
| 5,427,410 | A | | 6/1995 | Shiota et al. |
| 5,531,477 | A | * | 7/1996 | Madrigal et al. ......... 280/743.1 |
| 5,636,861 | A | * | 6/1997 | Orsulak et al. ........... 280/730.1 |
| 5,884,939 | A | * | 3/1999 | Yamaji et al. ............ 280/743.1 |
| 5,938,231 | A | * | 8/1999 | Yamazaki ................. 280/730.1 |
| 5,967,545 | A | * | 10/1999 | Iijima et al. ............... 280/730.1 |
| 5,967,547 | A | | 10/1999 | Narita et al. |
| 6,007,090 | A | | 12/1999 | Hosono et al. |
| 6,173,988 | B1 | | 1/2001 | Igawa |
| 6,186,544 | B1 | | 2/2001 | Igawa |
| 6,196,585 | B1 | * | 3/2001 | Igawa ....................... 280/743.1 |
| 6,264,237 | B1 | | 7/2001 | Terada |
| 6,299,202 | B1 | * | 10/2001 | Okada et al. ................. 280/732 |
| 6,457,744 | B1 | * | 10/2002 | Tonooka ..................... 280/732 |
| 6,557,891 | B2 | * | 5/2003 | Okada et al. ............. 280/743.1 |
| 6,739,622 | B2 | * | 5/2004 | Halford et al. ........... 280/743.1 |
| 6,848,709 | B2 | * | 2/2005 | Nagatsuyu ............... 280/730.1 |

(Continued)

FOREIGN PATENT DOCUMENTS

DE 29917343 U1 1/2000

(Continued)

OTHER PUBLICATIONS

European Search Report for EP 03 00 8855 dated Sep. 4, 2003.

*Primary Examiner*—Toan C To
(74) *Attorney, Agent, or Firm*—Fitch, Even, Tabin & Flannery

(57) ABSTRACT

An air bag apparatus is provided on a motorcycle. The apparatus includes an air bag that is restricted so as not to be expanded toward a body constituent part, and is guided to be expanded toward a rider protection region in the expansion direction by providing the air bag so it is rolled and folded outwardly from the body constituent part of the motorcycle, allowing it to be expanded and inflated toward the rider protection region, which is formed in front of a motorcycle rider, and above the body constituent part of the motorcycle in the case of the forward collision of the motorcycle.

2 Claims, 8 Drawing Sheets

U.S. PATENT DOCUMENTS

| | | |
|---|---|---|
| 6,854,762 B2 * | 2/2005 | Yanagibashi et al. ........ 280/736 |
| 6,988,743 B2 * | 1/2006 | Okamoto et al. ......... 280/743.1 |
| 2001/0003395 A1 | 6/2001 | Ariyoshi |
| 2003/0222439 A1 * | 12/2003 | Akiyama et al. ......... 280/730.1 |

FOREIGN PATENT DOCUMENTS

| | | | |
|---|---|---|---|
| DE | 10004307 A1 | 8/2001 | |
| GB | 1319375 | 6/1973 | |
| GB | 2369328 A | 5/2002 | |
| JP | 8080797 | 3/1996 | |
| JP | 9073529 | 3/1997 | |
| JP | 9328087 | 12/1997 | |
| JP | 10338096 | 12/1998 | |
| JP | 11278342 | 10/1999 | |
| JP | 2000355820 | 12/2000 | |
| JP | 2001088643 | 4/2001 | |
| JP | 2001-219885 | 8/2001 | |
| JP | 2001219884 | 8/2001 | |
| JP | 2001219885 | 8/2001 | |
| JP | 2001277977 | 10/2001 | |
| JP | 2003127944 | * | 10/2001 |
| JP | 2002085679 | * | 3/2002 |

* cited by examiner

AIR BAG APPARATUS FOR MOTORCYCLE, METHOD OF MANUFACTURING AIR BAG APPARATUS FOR MOTORCYCLE, AND MOTORCYCLE WITH AIR BAG APPARATUS

FIELD OF THE INVENTION

The present invention relates to construction technology of an air bag apparatus mounted on a motorcycle.

BACKGROUND OF THE INVENTION

A technology for protecting a rider on a motorcycle by mounting an air bag apparatus on a motorcycle is known. For example, Japanese Unexamined Patent Application Publication No. 2001-219885 discloses a scooter-type motorcycle and a technology for expanding and inflating an air bag located in the space between a body component member, such as a head pipe, and the seat on which the rider sits. The technology suggests the possibility of providing the air bag apparatus on the scooter-type motorcycle; however, further technological study on how much to expand the air bag inside the air bag apparatus generally provided on a motorcycle to protect the rider is necessary.

SUMMARY OF THE INVENTION

Accordingly, based on the above point, an object of the present invention in connection with an airbag apparatus provided on a motorcycle is to provide a useful technology for allowing an air bag to be smoothly expanded.

To achieve the above object, inventions described in the claims are provided.

According to one aspect of the invention, an air bag apparatus provided on a motorcycle is provided. The air bag apparatus includes an air bag, which is expanded and inflated toward the rider protection region of the motorcycle in the case of a forward collision of the motorcycle. The rider protection region is defined as a region, which is formed in front of the motorcycle rider and above a body constituent part of the motorcycle.

Further, the air bag of the present invention is restricted so as not to expand toward the body constituent part, and is guided to expand toward the rider protection region in the expansion direction. Thereby it is insured to provide a structure in which an air bag is smoothly and surely expanded toward a region to protect a rider.

In the specification, the "motorcycle" includes a saddle-type vehicle, that is, broadly all types of vehicles which a rider sits astride a seat of them, and includes, for example, a two-wheeled vehicle having a fuel tank provided in front of a rider seat, a scooter-type two-wheeled vehicle having a space between a rider seat and a head pipe for supporting a handle, or the like. In addition to the two-wheeled vehicle, a broader meaning of "motorcycle" also includes a vehicle having three or more-wheel and which a rider sits astride (for example, a three-wheeled vehicle used to deliver pizzas, a three or four-wheeled buggy-type vehicle for traveling on roads in bad-condition), or a vehicle which is driven by sled or pedrails and which a rider sits astride such as a snowmobile. Furthermore, the "body constituent part" typically includes a fuel tank in front of the rider seat, a handle, a head pipe for supporting the handle, and an indicating instrument such as a speedometer provided in the middle of the handle. The present invention provides a structure for preventing that the expansion of the air bag is hindered by the body component members of the motorcycle, itself, and allowing smooth expansion of the air bag.

Further, in the present invention, the "forward collision" broadly includes the collision shape in which a motorcycle collides with a collision object obliquely or in which just a part of the front parts of the motorcycle collides with a collision object head on as well as the shape in which a motorcycle collides with a collision object literally head on. In addition, the "rider protection region of the motorcycle" typically means a region for preventing a rider from being thrown away in front of the motorcycle in the case of forward collision while restricting the forward movement of the rider when the rider is about to move forward ahead of the motorcycle by the kinetic energy of the moving motorcycle. In addition, the "air bag apparatus" typically includes an air bag and means for inflating and expanding the air bag, which is preferably made by providing an inflator, for example, inside a retainer.

In one form of the invention, the guiding of the expansion direction of the air bag in the air bag apparatus for a motorcycle is performed by expanding the air bag, which is rolled and folded outwardly from the body constituent part of the motorcycle. Since the air bag is rolled and folded outwardly from the body constituent part of the motorcycle, the air bag is expanded when the roll is rotated and released outwardly from the body constituent part of the motorcycle. In the present invention, means for guiding the expansion direction of the air bag is provided by the shape of folding the air bag as a guided object, itself, and it is not necessary to provide a separate member for guiding the air bag so that the simple and easy guide of expansion direction is possible.

Further, in the present invention, the "outside of the body constituent part of the motorcycle" means the direction away from the body constituent part, and as a typical example, the "upside of the body constituent part of the motorcycle" belongs to this. The "rolled and folded state outwardly from the body constituent part" broadly includes the shape of winding and folding the air bag outwardly from the body constituent part, and it is preferable to consider and control parameters such as expansion speed of the air bag appropriately for the roll shape, the roll diameter and the winding number.

Further, the present invention includes the shape that the entire air bag is rolled and folded outwardly from the body constituent part, or the shape that the air bag is partially rolled and folded outwardly from the body constituent part. Further, it also includes the shape that after preliminarily folded, the air bag is rolled and folded again outwardly from the body constituent part.

In another form of the invention, the guiding of the expansion direction of the air bag in the air bag apparatus for a motorcycle is performed by expanding the air bag, which is provided on the body constituent part such that a bellows-shaped folding part is expanded toward the rider protection region. Since the air bag includes the bellows-shaped folding part, which is expanded toward the rider protection region, the air bag is expanded toward the rider protection region with the bellows-shaped folding part quickly released. In the present invention, means for guiding the expansion direction of the air bag according to one form the invention is provided by the shape of folding the bag as a guided object, itself, and it is not necessary to provide a separate member for guiding the air bag so that simple and easy guide of expansion direction is possible.

In another form of the invention, the air bag in the air bag apparatus for a motorcycle is configured to include a roll-shaped folding part which is rolled and folded outwardly from the body constituent part of the motorcycle, and a bellows-shaped folding part folded as the bellows-shape. Since the air bag is provided by appropriately combining the folding parts having different characteristics such as expansion speed, and simplicity to folding, it is possible to provide a more useful air bag apparatus.

In other aspects of the invention, there is provided a method of manufacturing an air bag apparatus for a motorcycle for allowing the air bag to be smoothly expandable toward the rider protection region just like each air bag apparatus described as above.

In another aspect of the invention, there is provided a motorcycle with an air bag apparatus being capable of smoothly expanding an air bag toward a rider protection region in the case of forward collision. It is also possible to provide the invention related with a motorcycle with an air bag apparatus having the substantially same components as those in each air bag apparatus described.

DETAILED DESCRIPTION OF THE PREFERRED EMBODIMENTS

Figure 1:
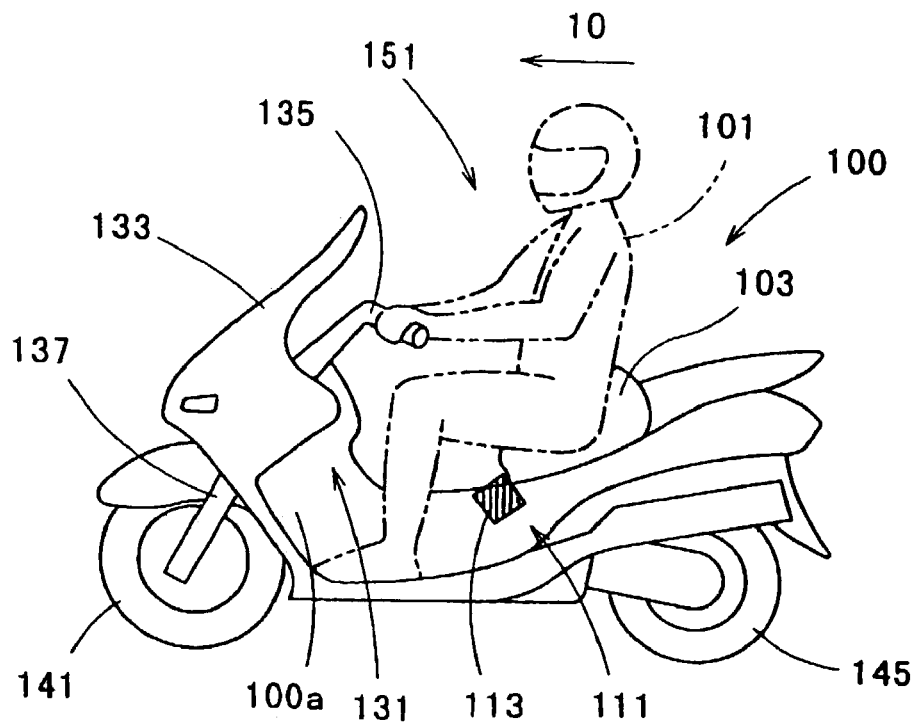
FIG. 1 illustrates the entire configuration of the two-wheeled vehicle according to an embodiment of the present invention.

Now hereinafter, a two-wheeled vehicle 100 and an air bag apparatus 101 according to an embodiment of the present invention will be explained in detail in reference to the drawings. The two-wheeled vehicle 100 corresponds to the "motorcycle" of the present invention, and as a scooter, includes a main body part 100a of a two-wheeled vehicle having an engine or a main frame, etc., a seat 103 which a rider 101 sit astride, a front cowl 133, a handle 135, a head pipe 137 for supporting a handle, and a front wheel 141 and a rear wheel 145 having the head pipe 137 for supporting a handle between them and connected to the main body part 100a of a two-wheeled vehicle as shown in FIG. 1. The front cowl 133, the handle 135, and the head pipe 137 for supporting a handle form a body constituent part 131 along with indicating instruments such as a speedometer which is not shown. Further, in the motorcycle having a fuel tank annexedly provided in front of the seat 103, the fuel tank also forms the body constituent part.

A rider protection region 151 in the case of forward collision is formed in front of the motorcycle 101 and above a body constituent part 131. The rider protection region 151 in the case of a forward collision is the region to protect the rider 101, who is about to move forward (left direction in FIG. 1) by the impact when the two-wheeled vehicle 100 collides forward, and corresponds to one shape of the "rider protection region" of the present invention. In this embodiment, as described below, the air bag (referred to as numeral 121 after FIG. 2) is expanded and inflated toward the rider protection region 151 in the case of the forward collision.

Figure 2:
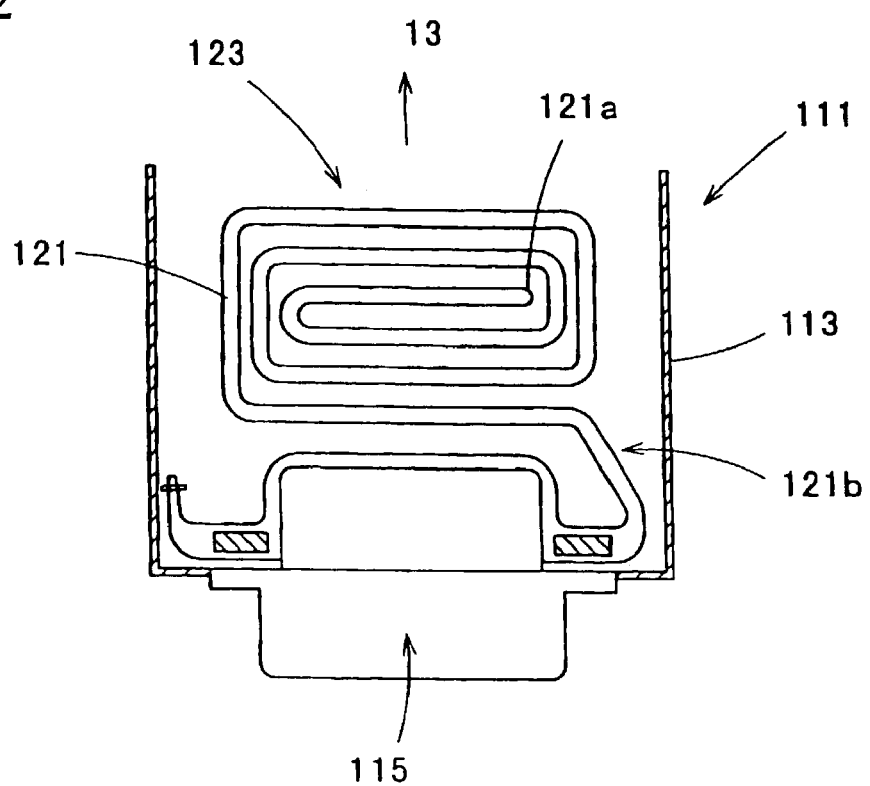
FIG. 2 illustrates the configuration of the air bag apparatus used in the embodiment of the present invention.

An air bag apparatus 111 is placed under the seat 103 to face the rider protection region 151 in the case of the forward collision. FIG. 2 schematically shows the configuration of the air bag apparatus 111 used in this embodiment. The air bag apparatus 111 includes a retainer 113 as a receptor, an air bag 121 received inside the retainer 113 which is folded, and an inflator 115 for supplying an expansion gas such that the air bag 121 is expanded from the retainer 113 and inflated. In addition, the expansion (extension) direction of the air bag is denoted by an arrow 13 in FIG. 2.

As shown in FIG. 2, the air bag 121 is rolled around a folding center 121a of a front end thereof clockwise to form a roll-shaped folding part 123, and received inside the retainer 113. In addition, an opening end part 121b of the air bag 121 is connected to a gas supplying part of the inflator 115 with adhered thereon.

Figure 4:
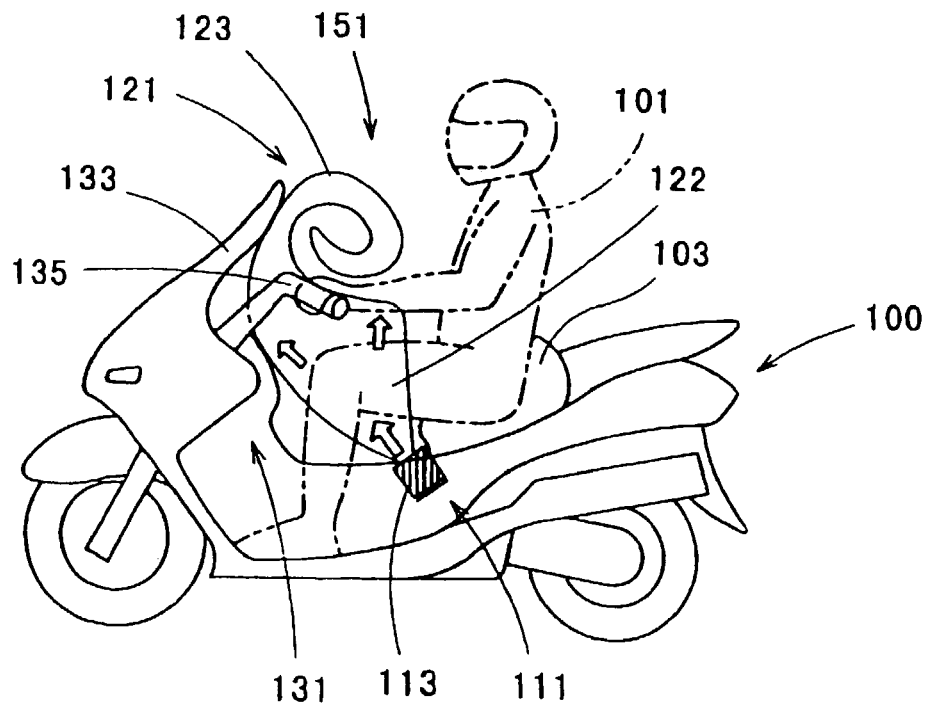
FIG. 4 illustrates the state that the release of the roll of the roll-shaped folding part and the formation of the inflation part are performed.

As well illustrated in FIG. 4 for the relation of the roll direction of the roll-shaped folding part 123 and the two-wheeled vehicle 100 in this embodiment, the air bag apparatus 111 is provided on the two-wheeled vehicle 100 such that the roll of the roll-shaped folding part 123 is rotated, and unfolded upwardly or obliquely forward from the two-wheeled vehicle 100 when the air bag 121 inside the retainer 113 is expanded outwardly. In other words, the air bag apparatus 111 is appropriately provided under the seat 103 of the two-wheeled vehicle 100 such that the roll of the roll-shaped folding part 123 in the air bag 121 is released and expanded toward the direction away from the body constituent part 131.

Figure 3:
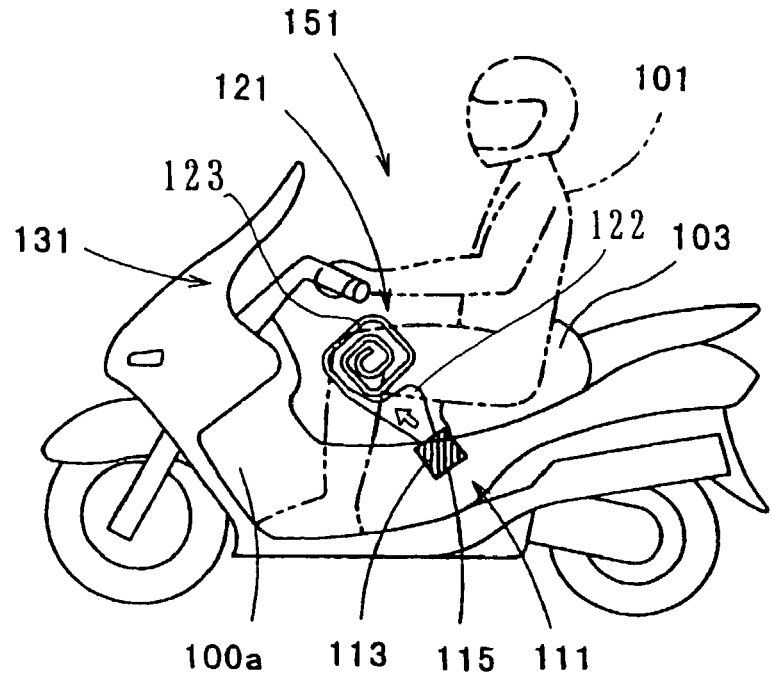
FIG. 3 illustrates the initial state of the operation of the air bag apparatus in the case of a forward collision.

Next, the operation of the two-wheeled vehicle 100 and the air bag apparatus 111, which is manufactured and provided as above in this embodiment, will be explained. When the two-wheeled vehicle 100 which a rider 101 rides on occurs the collision accident toward its movement direction, the rider 101 in FIG. 1 is about to move (be thrown away) forward from the two-wheeled vehicle 100. Furthermore, the movement direction of the rider 101 in the case of the forward collision is denoted by an arrow 10 in the drawing. In this embodiment, by the detection of the forward collision, the air bag 121 starts to be expanded from the air bag apparatus 111 toward the rider protection region 151 in the case of the forward collision. The state is illustrated in FIG. 3. As described above, when the roll of the roll-shaped folding part 123 in the air bag 121 is rotated and released toward the rider protection region 151 in the case of the forward collision, the roll-shaped folding part 123 in the air bag 121 is expanded from the space between both legs of the rider 101.

Further, as shown in FIG. 3, the expansion of the air bag 121 starts, and an expansion gas is sent into the air bag 121 through the inflator 115 inside the retainer 113, so that an expansion part 122 in the air bag 121 is sequentially formed from the retainer 113.

Figure 5:
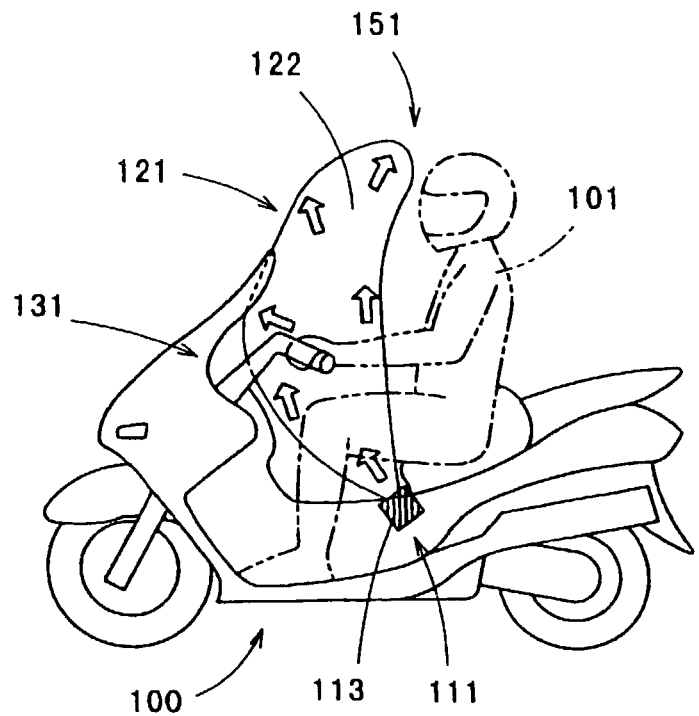
FIG. 5 illustrates the state that the air bag is inflated toward the rider protection region in the case of the forward collision.

Further, as shown in FIG. 4, the inflation part 122 in the air bag 121 is gradually expanded, and the air bag 121 is expanded toward the rider protection region 151 in the case of the forward collision. The roll-shaped folding part 123 in the air bag 121 is expanded when the roll is rotated and released outwardly from the body constituent part 131 (the upper side of the two-wheeled vehicle 100 in FIG. 4), and therefore, the inflation part 122 is formed in the rider protection region 151 in the case of the forward collision as shown in FIG. 5. In the case of the expansion of the air bag 121, since the roll is released toward the direction that the roll-shaped folding part 123 is get away from the body constituent part 131, the air bag 121 is not prevented from being expanded by the body constituent part 131, so that the air bag 121 can be smoothly expanded toward the rider protection region 151 in the case of the forward collision.

Figure 6:
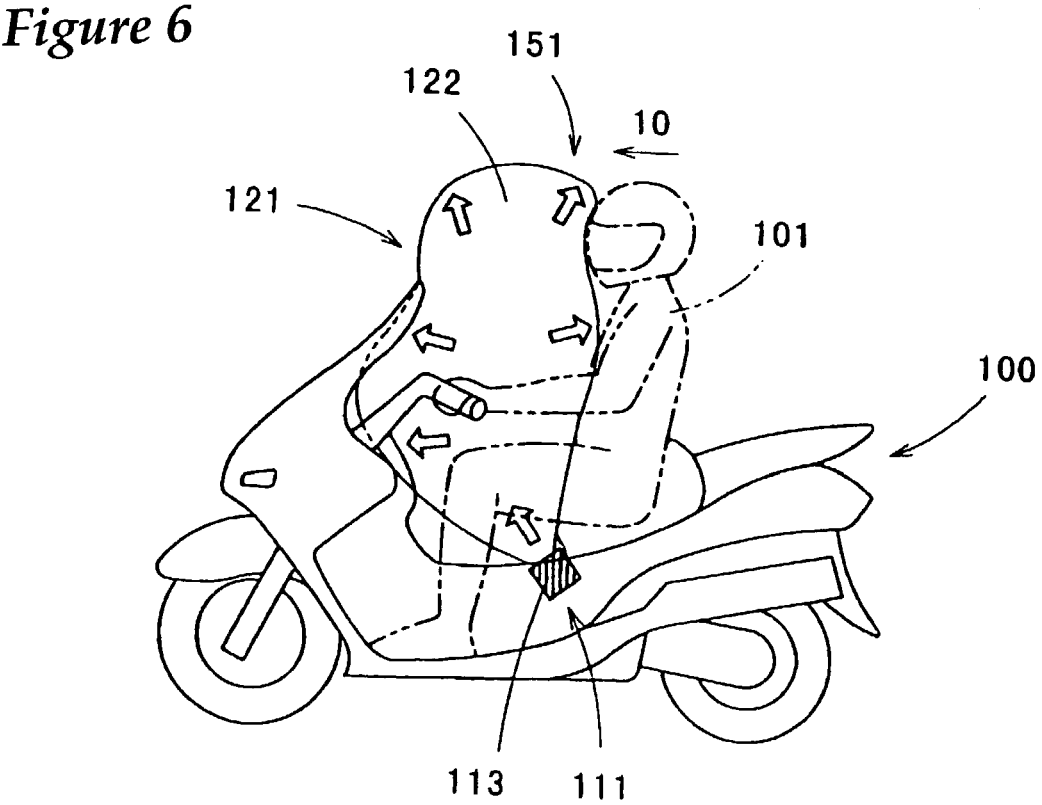
FIG. 6 illustrates the state that the expansion and inflation of the air bag are completed.

FIG. 6 illustrates the state that the air bag 121 is completely inflated by the operation of the air bag apparatus 111 according to the present embodiment. The inflation part 122 of the air bag 121 fills the rider protection region 151 in the case of the forward collision, and surely restrains and holds the rider 101, who is about to move to the direction of an arrow 10 by the kinetic energy in the case of the collision, in the rider protection region 151 in the forward collision to prevent from being thrown away forward from the two-wheeled vehicle 100 in advance.

In the air bag apparatus 111 according to the present embodiment, the air bag 121 is to operate and be expanded toward the rider protection region 151 in the case of the forward collision from the retainer 113, but the air bag 121 has the roll-shaped folding part 123, which is rolled outwardly from the body constituent part 131, and the roll-shaped folding part 123 is expanded when the roll is rotated and released outwardly from the body constituent part 131. Therefore, it is effectively prevented that the expansion of the air bag 121 is hindered by the body constituent part 131, and it is possible to smoothly expand the air bag 121 toward the rider protection region 151 in the case of the forward collision.

Figure 7:
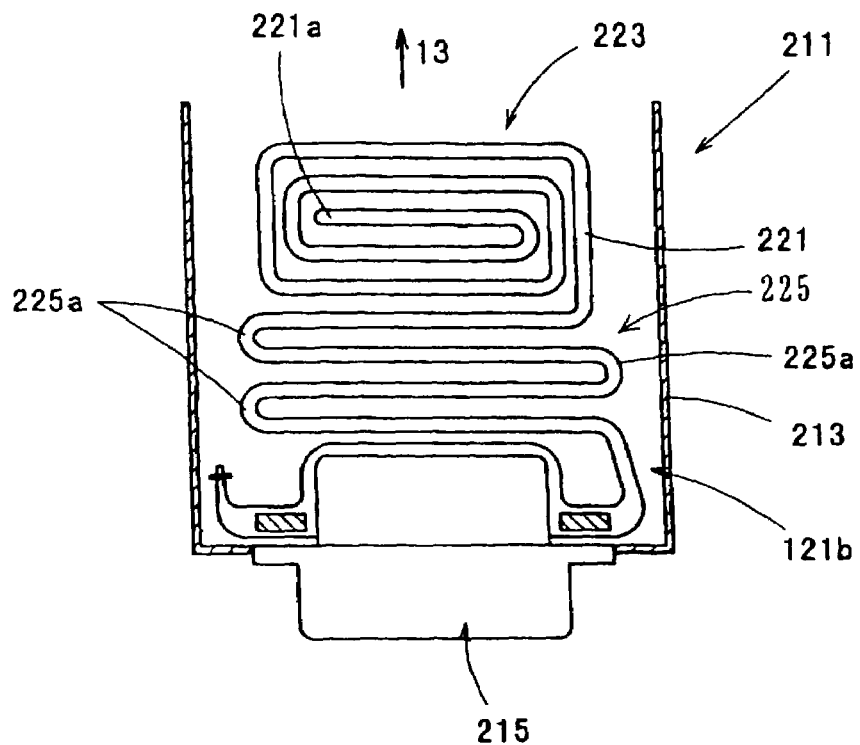
FIG. 7 illustrates the configuration of the air bag apparatus used in the second embodiment.

Next, the second embodiment of the present invention will be explained in reference to FIGS. 7 to 11. The description of a rider is omitted in FIGS. 8 to 11 for convenience. The second embodiment relates to the modification type of the folding part in the air bag 121 of the air bag apparatus 111 described as above, but the detailed description of the components having the substantially same configuration as those in the first embodiment is omitted for convenience. An air bag apparatus 211 of the second embodiment includes a retainer 213, an air bag 221 received by the retainer 213 with folded, and an inflator 215 as shown in FIG. 7. The air bag 221 is received inside the retainer 213 with a bellows-shaped folding part 225 having a plurality of bending parts 225a and a roll-shaped folding part 223 combined. The air bag 221 is configured such that the bellows-shaped folding part 225 is placed toward the retainer 213 in the case of the expansion and the roll-shaped folding part 223 is placed toward the expansion forward direction. Furthermore, the expansion direction (extension direction) of the air bag 221 is denoted by an arrow 13 in FIG. 7. And, the air bag apparatus 211 is provided under a seat 103 of a two-wheeled vehicle 200 as shown in FIG. 8.

Further, the roll-shaped folding part 223 is rolled clockwise around a folding center 221a of a front end thereof in FIG. 7. From the relation of the roll-shaped folding part 223 and the two-wheeled vehicle 200 in the second embodiment, the roll-shaped folding part 223 is received by the retainer 213 in the rolled state outwardly from the body constituent part 131 comprising a front cowl 133, a handle 135, and a head pipe 137 for supporting a handle, etc. as shown in FIG. 8 and in the case of the expansion, it is configured such that the roll is released outwardly (upward in FIG. 8) from the body constituent part 131 and from the space between both legs of the rider.

Figure 8:
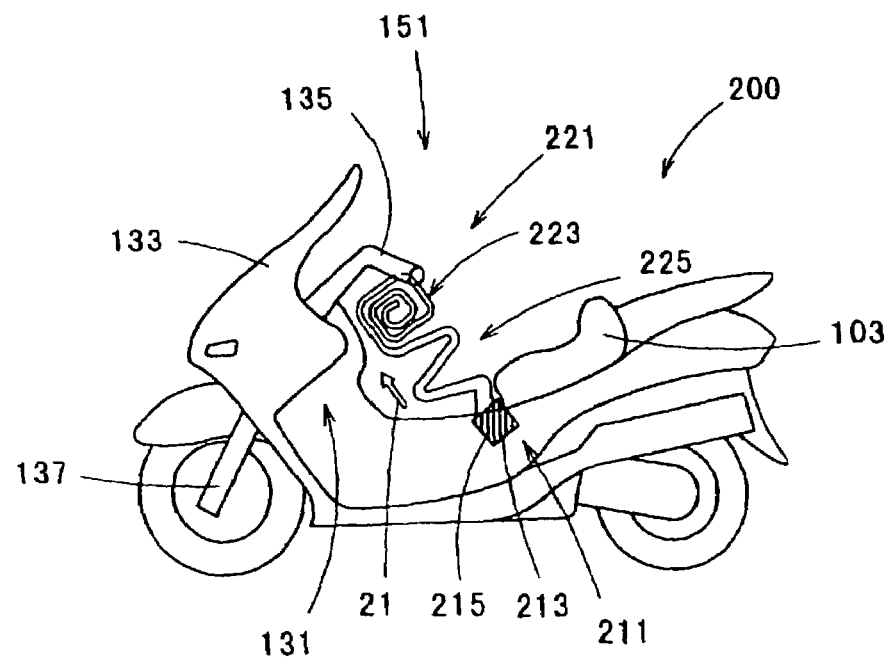
FIG. 8 illustrates the initial state that the expansion of the air bag is started according to the second embodiment of the present invention.
Figure 9:
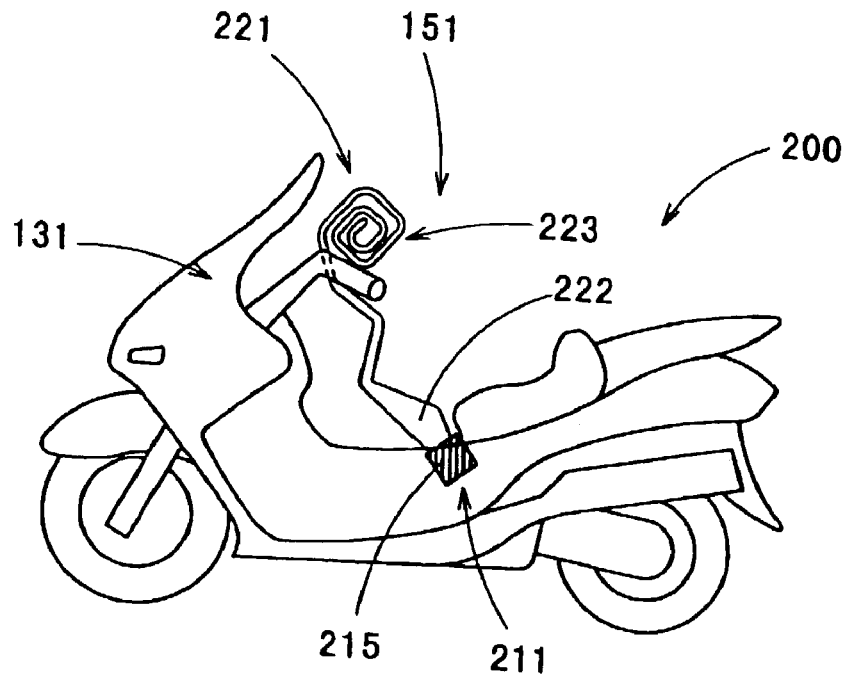
FIG. 9 illustrates the state of the air bag expanded by the bending-release of a bellows-shaped folding part according to the second embodiment.

In the case that the two-wheeled vehicle 200 of the second embodiment collides forward, the air bag 221 starts to be expanded from the air bag apparatus 211 toward the rider protection region 151 in the case of the forward collision as shown in FIGS. 8 and 9. Here, among the air bag 221 extracted from the retainer 213, the bending part 225a (reference to FIG. 7) of the bellows-shaped folding part 225 placed toward the retainer 213 starts to be released and expanded. At the same time, there starts the formation of an expansion part 222 inside the air bag 221 by an inflation gas supplied from the inflator 215 inside the retainer 213 (reference to FIG. 9).

The bellows-shaped folding part 225 is configured to be expanded toward the rider protection region 151 in the case of the forward collision by the release of the bending part 225a (its bending is released toward the direction of an arrow 21 in FIG. 8). That is, the bellows-shaped folding part 225 in the air bag 221 is released quickly at its initial movement by appropriately controlling the bending-release distance of the bending part 225a of the bellows-shaped folding part 225.

Figure 10:
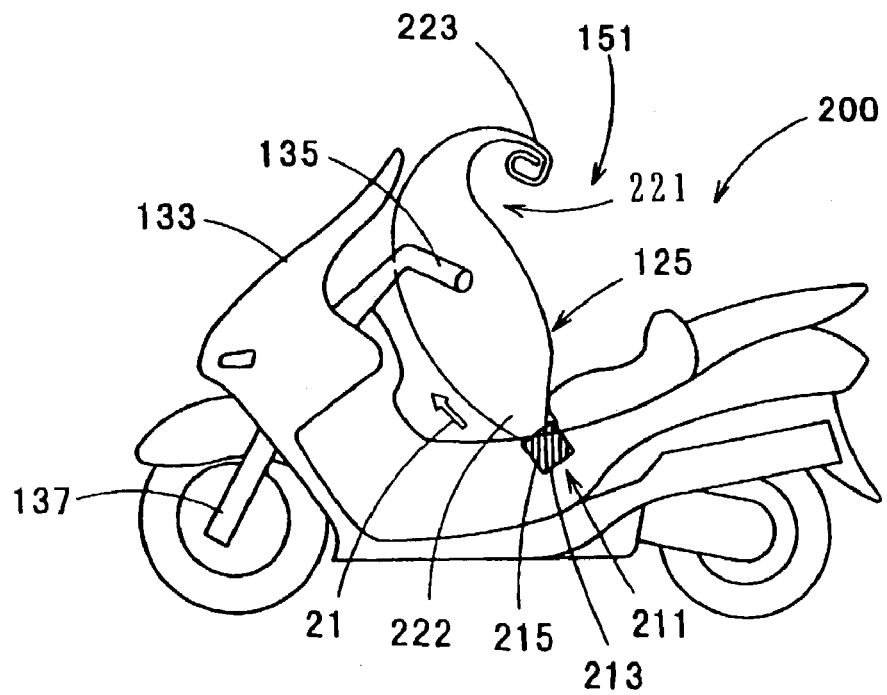
FIG. 10 illustrates the state of the air bag expanded by the roll release of the roll-shaped folding part according to the second embodiment.

If the air bag 221 is expanded with the bending of the bending part 225a of the bellows-shaped folding part 225 released, the inflation part 222 is expanded by an expansion gas from the inflator 215 as shown in FIG. 10, and the expansion of the roll-shaped folding part 223 starts. As described above, since the roll-shaped folding part 223 is configured to be released with the roll rotated outwardly from the body constituent part 131, the air bag 221 is away from the body constituent part 131 and smoothly expanded toward the rider protection region 151 in the case of the forward collision.

Figure 11:
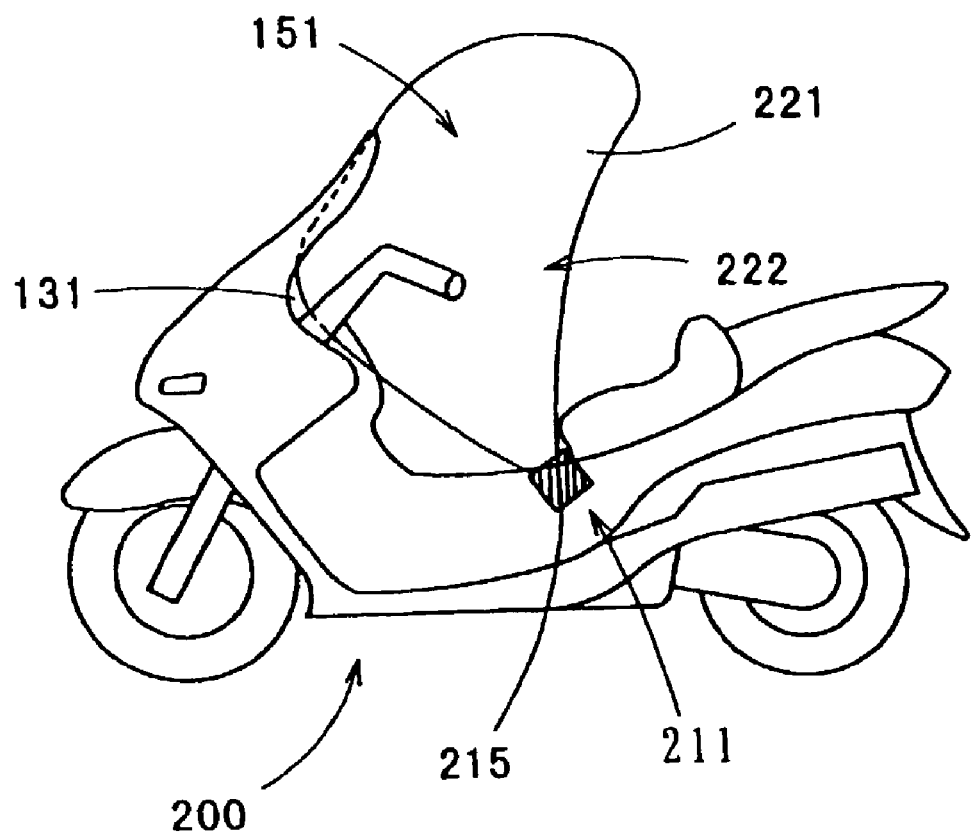
FIG. 11 illustrates the state that the expansion and inflation of the air bag are completed according to the second embodiment.

In this manner, the state that the air bag apparatus 211 of the second embodiment is operated and the air bag 221 is completely expanded is illustrated in FIG. 11. The inflation part 222 of the air bag 221 fills the rider protection region 151 in the case of the forward collision, and surely restrains and holds the rider 101, who is about to move forward by the kinetic energy in the case of the collision (not illustrated for convenience), in the rider protection region 151 in the case of the forward collision to protect him.

Further, in the second embodiment, since the bending of the bellows-shaped folding part 225 is released toward the rider protection region 151 in the case of the forward collision, the air bag 221 when it initially starts to move is smoothly expanded without the hindrance by the body constituent part 131. Therefore, for the following expansion of the roll-shaped folding part 223, in the case that it is expanded distanced enough away from the body constituent part 131, the configuration of releasing the roll outside of the body constituent part 131 is not necessarily an essential element.

Figure 12:
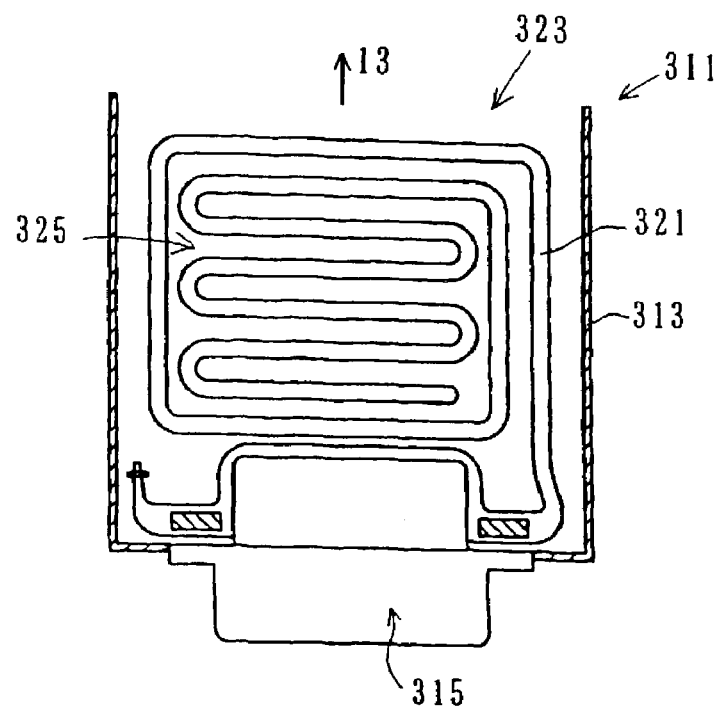
FIG. 12 illustrates the configuration of the air bag apparatus used in the third embodiment.

Next, the third embodiment of the present invention will be explained in reference to FIGS. 12 to 15. In the third embodiment, the detailed description of the components having the substantially same configuration as those in the first embodiment and the second embodiment is omitted for convenience. A two-wheeled vehicle 300 of the third embodiment includes an air bag apparatus 311 which is provided under a seat 103 just as same as in the first and the second embodiments. The air bag apparatus 311 includes a retainer 313, an air bag 321 received by the retainer 313, and an inflator 315 as shown in FIG. 12. The air bag 321 is received inside the retainer 313 to be expandable toward the direction of a numeral 13. In the case of the configuration of the airbag 321, on the contrary to the configuration in the second embodiment described in FIG. 7, a roll-shaped folding part 323 is provided above an inflation gas from the inflator 315, and a bellows-shaped folding part 325 having a plurality of bending parts under the roll-shaped folding part 323 (the front end of the air bag 321).

Figure 13:
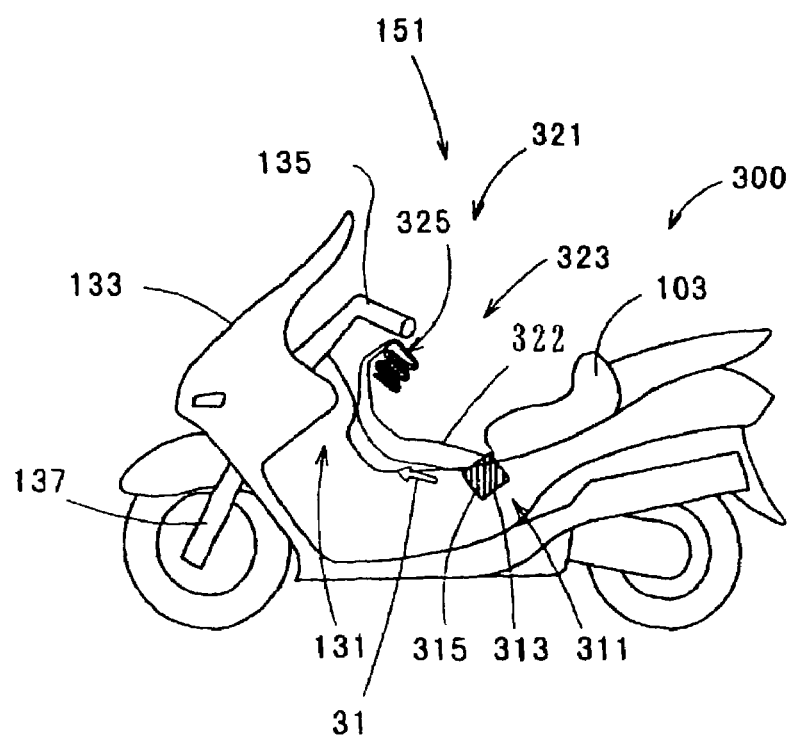
FIG. 13 illustrates the initial state that the expansion of the air bag is started, and the roll of the roll-shaped folding part is released according to the third embodiment of the present invention.

In the third embodiment, the roll of the roll-shaped folding part 323 is rotated outwardly from a body constituent part 131 (upward in FIG. 12) and released from the space between the both two legs of a rider as shown in FIG. 13, and at the same time, an inflation part 322 is formed by inflation gas supplied from the inflator 315, and the air bag 321 is expanded. The roll-shaped folding part 323 is expanded toward the direction of an arrow 31 in FIG. 13, but since the roll is rotated and released outwardly from the body constituent part 131, the air bag 321 is expandable without the hindrance by the body constituent part 131.

Figure 14:
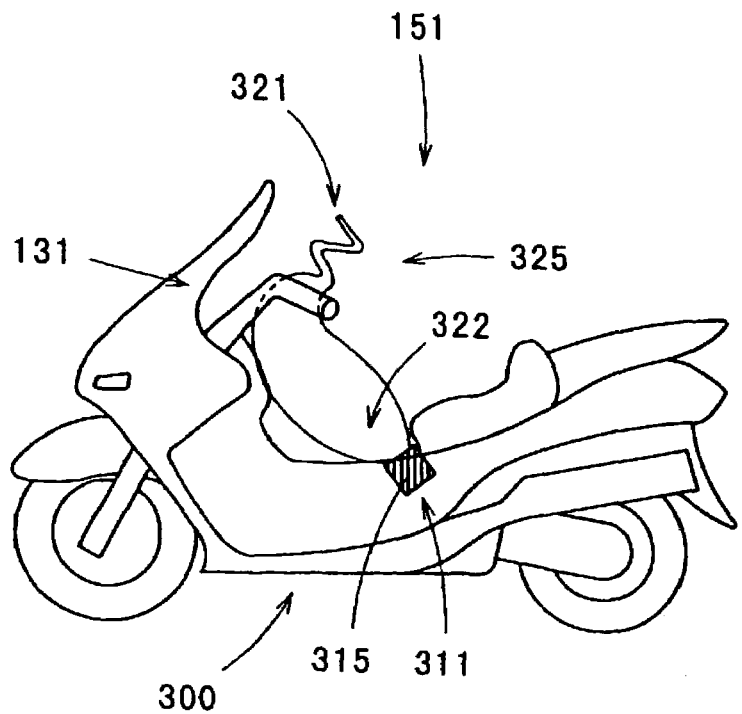
FIG. 14 illustrates the state of the air bag expanded by the bending-release of the bellows-shaped folding part according to the third embodiment.
Figure 15:
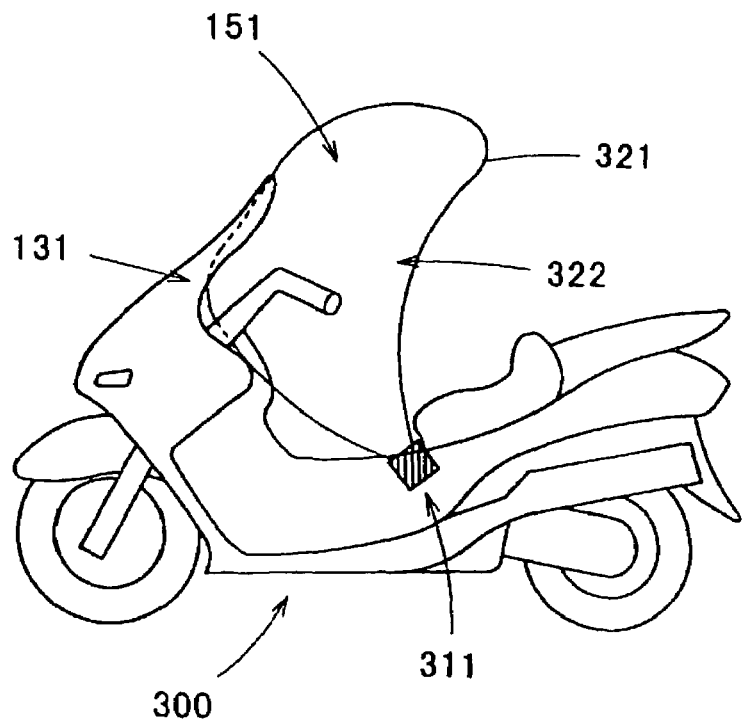
FIG. 15 illustrates the state that the expansion and inflation of the air bag are completed according to the third embodiment.

If the roll-shaped folding part 323 is expanded, the bellows-shaped folding part 325 is expanded as shown in FIG. 14, and at the same time, the inflation part 322 is expanded. In the third embodiment, the bending part of the bellows-shaped folding part 325 is configured such that the bending of the bending part is released upward from the body constituent part 131. Thereby, the inflation part 322 of the air bag 321 fills the rider protection region 151 in the case of the forward collision as shown in FIG. 15, and surely restrains and holds the rider 101 (not illustrated for convenience), who is about to move forward by the kinetic energy in the collision, in the rider protection region 151 in the case of the forward collision to protect him.

In each configuration according to the first to the third embodiments, the air bag 121 (221, 321) is restricted not to be expanded toward the body constituent part 131 having the roll-shaped folding part 123 (223, 323) or the bellows-shaped folding part 125 (225, 325) and is guided to be expanded toward the rider protection region 151. Thereby, the air bag 121 (221, 321) can be smoothly and surely expanded toward the rider protection region. Furthermore, due to the configuration of guiding the expansion direction by using the folded structure of the air bag 121 (221, 321) itself, the guide of the expansion direction can be simply and exactly made.

Further, the air bags according to the second and the third embodiments employ the configuration of appropriately combining the folding parts having different characteristics, such as the roll-shaped folding part 123 (223, 323) releasing its roll outwardly from the body constituent part 131, and the bellows-shaped folding part 125 (225, 325) expanded by the release of a plurality of bending parts, and of guiding the expansion, and as a result, the expansion speed or the characteristics of easily-foldable quality are easily controlled so as to provide more useful air bag apparatus 111 (211, 311).

According to the present invention, there is provided a useful technology for smoothly expanding an air bag in an air bag apparatus provided on a motorcycle.

What is claimed is:

1. An air bag apparatus for a motorcycle having body parts including a frame for supporting a seat in which a rider sits rearwardly of handle bars, the air bag apparatus comprising:
    a retainer mounted to a portion of the frame;
    an inflator in the retainer;
    an air bag housed in the retainer for being deployed in a generally vertical upward direction in the event of forward crash conditions generally occurring forwardly of the handle bars;
    a rolled portion of the air bag in the retainer that is rolled in a predetermined rotary direction in the retainer so that the air bag unrolls in an opposite rotary direction during inflation in the generally vertical, upward direction and above the handle bars;
    a bellows-shaped portion of the airbag in the retainer having a plurality of straight uninflated portions that are interconnected by generally U-shaped bent portions so that adjacent straight uninflated portions lay flat on and against each other in the retainer with the bellows-shaped portion being between the rolled portion and the inflator in the generally vertical, upward direction with inflation gas from the inflator flowing through the bellows-shaped portion and then into the rolled portion so that the bellows-shaped portion is fully inflated before and below the rolled portion is fully inflated;
    wherein the airbag is rolled in an orientation that is centrally aligned over the straight uninflated portions of the airbag bellows-shaped portion for being inflated in the vertical, upward direction over the inflated bellows-shaped portion; and
    a lowermost uninflated portion of the rolled portion in the retainer that is directly connected to an uppermost one of the straight uninflated portions of the airbag bellows-shaped portion and which extends in the vertical upward direction therefrom from a lateral position that is spaced laterally across the uppermost straight uninflated portion from an uppermost one of the U-shaped bent portions of the airbag bellows-shaped portion so that with airbag deployment and prior to full inflation of the bellows-shaped portion with the straight uninflated portions reoriented to extend in general vertical alignment with each other, the rolled portion of the airbag will already have begun to unroll.

2. The airbag apparatus of claim 1 wherein the airbag rolled portion and the airbag bellows-shaped portion have approximately the same size in the vertical, upward direction when inflated.

* * * * *